May 9, 1939.  R. N. DOBLE  2,157,656
TEA BAG, COFFEE BAG, AND THE LIKE
Filed June 23, 1937  2 Sheets-Sheet 2
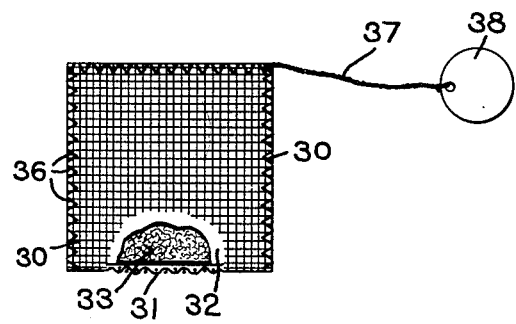
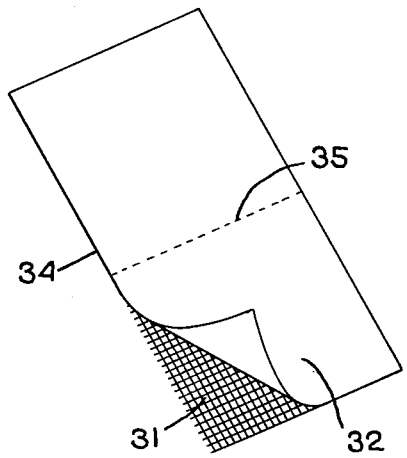
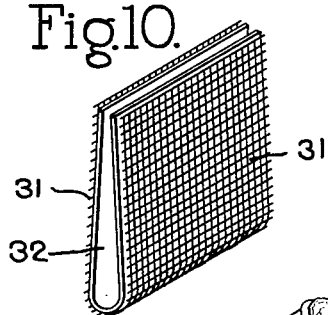
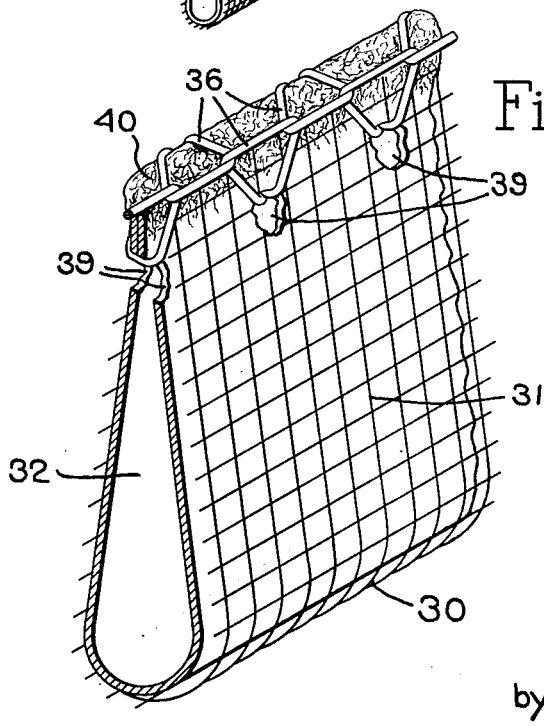
Inventor
Ralph N. Doble
by Heard Smith & Tennant
Attys.

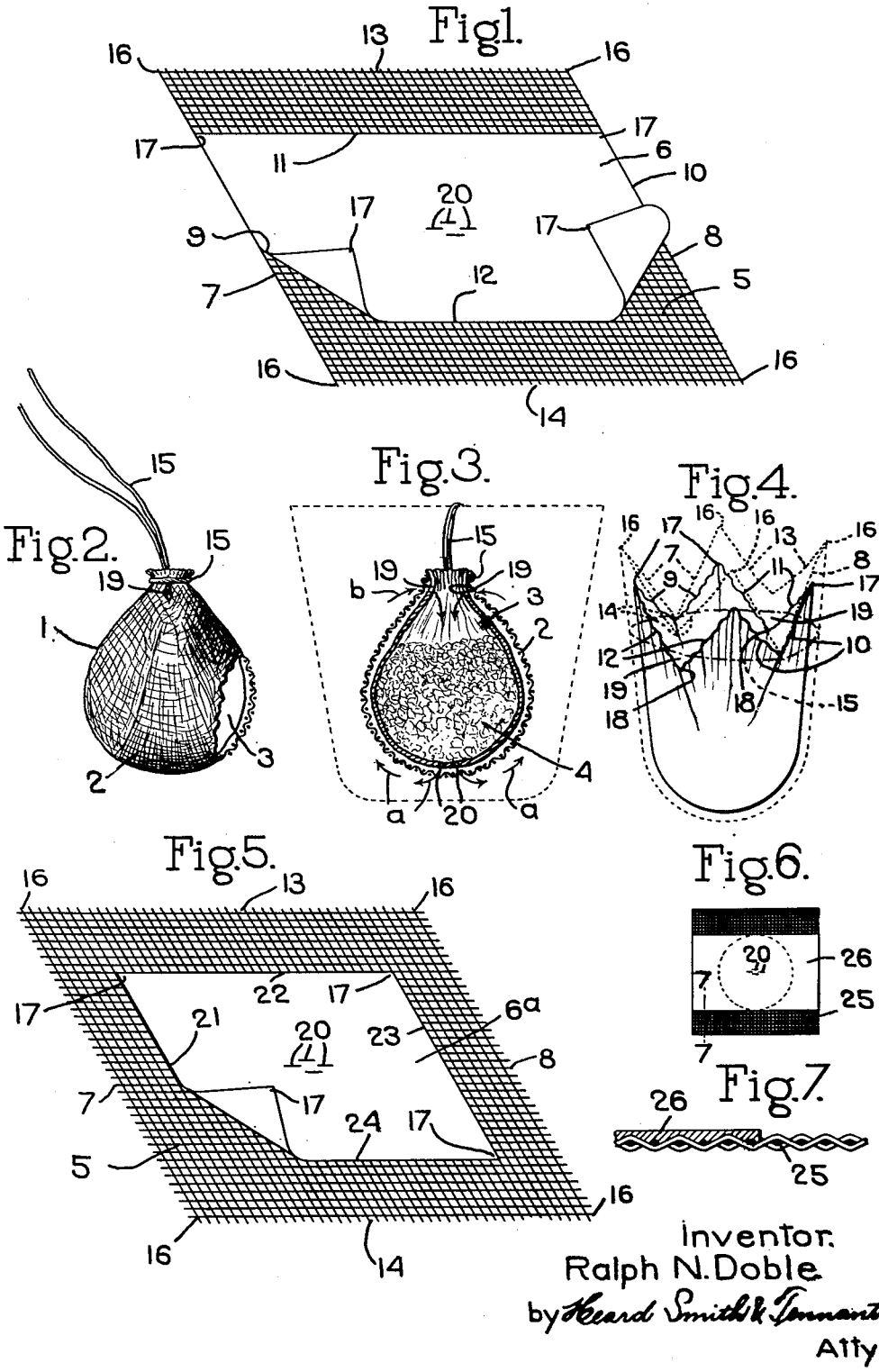

UNITED STATES PATENT OFFICE 2,157,656

TEA BAG, COFFEE BAG, AND THE LIKE

Ralph N. Doble, Hingham, Mass.

Application June 23, 1937, Serial No. 149,891

12 Claims. (Cl. 99—77.1)

This invention relates to bags such as are used in the manufacture of tea balls, coffee bags and the like designed for making individual cups of tea or coffee. These tea balls or coffee bags are in the form of a small envelope or bag of porous material which contains sufficient tea leaves or coffee grounds for the making of an individual cup of tea or coffee by infusion. These bags are made in various ways, such as gathering the edges of a blank of bag material together and then fastening the gathered edges together by a tie string, clip or the like, or by folding a blank on itself centrally and sewing the edges of the blank together, or by providing two blanks of the same size and sewing them together at the edges, it being understood, of course, that the required amount of tea or coffee is to be introduced into the bag before the latter is entirely closed.

In order to make a cup of tea or coffee which is clear and without sediment it is important that the material of the bag should have not only high porosity to permit the water to readily flow therethrough, but should also be impervious to the passage therethrough of the dust of the tea leaves or the ground coffee. In other words, the material of which the bag is made should be porous but should also act as a filter so far as the passage therethrough of the dust from the tea leaves or finely ground coffee is concerned.

A fine mesh cheesecloth meets these requirements fairly well but it has the disadvantage that it is rather expensive.

In an effort to provide less expensive bag material it has been proposed to make the bag of two plies, an outer ply of coarse inexpensive cheesecloth and an inner ply of paper which has the requisite porosity but which nevertheless acts as a filter to prevent the passage therethrough of the dust from the tea or coffee. The fabric layer imparts to the bag the necessary strength to permit it to be handled, shipped, stored, etc., and the paper layer provides the bag with the necessary filtering qualities.

One way in which these two ply tea bags or coffee bags have been heretofore made is to provide a two-ply blank, one ply being of inexpensive cheesecloth and the other ply being of the paper having the required filtering characteristics, both plies being of the same size, and then gathering the edges of the blank together and fastening them in their gathered-together relation by means of a tie string, clip or other fastening device, it being understood, of course, that the requisite amount of tea leaves or coffee grounds would be introduced into the bag before the fastening device is applied.

Where the two layers of the bag material are of the same size the edges of the paper layer or ply are tied into the neck of the bag in the same way that the edges of the cloth layer are.

While a tea bag or coffee bag of this construction has the advantage that it is less expensive than a tea bag or coffee bag in which the envelope is a fine cheese cloth because the combined cost of the paper layer and the coarse cheesecloth layer is less than the single layer of more expensive cheese cloth, yet it has the disadvantage that when used in making a cup of coffee it works rather slowly and considerable time is required to make a proper or acceptable coffee infusion.

In order to make satisfactory coffee it is desirable that the water should circulate through the coffee grounds, and hence in order to make a satisfactory cup of coffee by placing a coffee bag in a cup and filling the cup with boiling water it is highly desirable that there should be a circulation of the water through the coffee bag during the infusing operation.

The coffee infusion or coffee liquor which is produced by pouring water on the coffee grounds has a greater specific gravity than water and, therefore, when a coffee ball is being used for making a cup of coffee the coffee liquor produced by the contact of the coffee with the hot water will tend to gravitate downwardly through the ball and to the bottom of the cup, and this action will tend to set up the required circulation of the water through the coffee ball. The immersion of coffee in hot water, however, produces a slight amount of gas and, therefore, when a coffee bag containing coffee is dipped into hot water in a cup, or hot water is poured over such a coffee bag, there is a small amount of gas generated within the bag. In the case of the two-ply bag where the ply of paper material is tied into the neck of the bag by the tie string the bag will be completely lined with paper, and the gas which is formed within the bag, as above described, will tend to gather in the top of the bag and remain there. This will interfere with the circulation of the water through the bag and thus delay the infusing operation and prolong the time necessary to make a satisfactory cup of coffee.

It is one of the objects of my invention to provide an improved tea bag or coffee bag of the two-ply type which is so constructed as to facilitate rather than to retard the circulation of water therethrough, thereby speeding the infusing operation, especially when coffee is being made.

This end is accomplished by so making the bag that the paper ply will be provided with a vent or vents through which any gas generated within the bag may readily escape and which also facilitate the circulation of water through the bag.

Various ways of providing the vent or vents may be employed without departing from the invention. In the case of a bag made by gathering together the edges of a two-ply blank one convenient way for providing for the vent or vents is to use a blank in which the paper ply is sufficiently smaller than the fabric ply, so that when the edges are gathered together and secured with the fastening device some portion, at least, of the edge of the paper ply will be located below the fastening device thereby providing the desired vent. In making such a vent the edges may be gathered together so that either the fabric ply or the ply of paper material will be on the outside of the bag. If the bag is made with the ply of paper material on the outside then such ply would naturally be of a paper material which would retain its sheet formation when soaked in hot water. In the case of a two-ply bag in which the edges of the blank are sewed together to form the bag I propose to so carry out the sewing operation that the needle holes through the paper will provide the bag with the necessary vent to make it function properly when containing coffee grounds and being used for making a coffee infusion.

In order to give an understanding of my invention I have illustrated in the drawings some embodiments thereof which will now be described after which the novel features will be pointed out in the appended claims.

In the drawings;

Fig. 1 is a view showing a two-ply blank from which a tea ball or coffee bag embodying my invention may be made;

Fig. 2 is a view of the completed tea bag or coffee bag;

Fig. 3 is a sectional view through the coffee bag showing the vent in the upper end;

Fig. 4 shows a step in the process of forming the bag from the two-ply blank shown in Fig. 1;

Fig. 5 is a view similar to Fig. 1 but illustrating a different form of two-ply blank;

Fig. 6 is a view on a reduced scale showing a different form of blank which may be used in making a bag embodying my invention;

Fig. 7 is an enlarged sectional view on the line 7—7, Fig. 6;

Fig. 8 is a view, with parts broken out, showing a sewed tea bag or coffee bag embodying my invention;

Fig. 9 is a perspective view illustrating the blank from which the tea bag of Fig. 8 may be made;

Fig. 10 shows the blank folded ready to have the edges sewed together;

Fig. 11 is an enlarged fragmentary view of the sewed bag illustrating the manner in which the bag is vented.

Referring first to Figs. 1 to 7 which show a tea bag or coffee bag of the type made by gathering and fastening together the edges of a two-ply blank, I indicates a tea bag or coffee bag of this construction, it having an outer ply 2 and an inner ply 3, one of said plies being of some inexpensive fabric like coarse cheesecloth and the other ply being of thin paper material which has high porosity but which also has a filtering characteristic in that it will prevent passage therethrough of tea dust or coffee dust. The bag may be made with the ply of paper material either on the inside of the bag or on the outside, and in the drawings I have illustrated a construction wherein the bag is made with the fabric ply on the outside and the ply of paper material on the inside. Various kinds of paper may be used which meets the requirement that it shall have the necessary degree of porosity and shall at the same time prevent the passage of small particles of tea leaves or coffee grounds and shall also have the capacity of retaining its sheet formation when wet. Paper known as rice paper or paper made from plants or trees of the Musa family makes satisfactory material for this purpose, but I wish it understood that the invention is not limited to any particular kind of paper.

A bag embodying my invention may be made from a blank, such as shown in Fig. 1, which comprises a layer or ply 5 of inexpensive fabric, such as coarse cheesecloth, and a second layer 6 of paper, these two layers being superposed on each other. The paper layer 6 is smaller in size than the fabric layer 5, and it may be smaller in each dimension or in only one dimension. As shown in Fig. 1 the layer or ply 5 of fabric is essentially square and the layer or ply 6 has the same dimension as the ply 5 in one direction but is narrower than the cloth ply in the other direction. For instance, in Fig. 1 the paper ply 6 has a length to extend from the edge 7 of the cloth ply to the opposite edge 8 so that when the two plies are superposed the edges 9, 10 of the paper ply register with the edges 7 and 8 of the cloth ply. The paper ply, however, is narrower in the opposite direction than the cloth ply so that when the two plies are superposed the edges 11 and 12 of the paper ply lie well within the edges 13 and 14 of the cloth ply 5.

The bag 1 is made in the usual way by first superposing the two plies 5 and 6 on each other and then gathering together the edges 7, 13, 8, 14 of the cloth ply, as shown in Fig. 4, to produce a bag-shaped article, and this may be done so that the cloth ply is on the outside and the paper ply on the inside, as shown in the drawings, or so that the paper ply is on the outside and the cloth ply on the inside. In Fig. 4 the edges 7, 13, 8 and 14 of the cloth ply are only partially gathered together, and while they are still separated as shown in Fig. 4, the requisite amount of tea or coffee is deposited in the bag and thereafter the gathered-together edges of the bag are fastened tightly together by means of a suitable fastening device, such as a tie cord 15.

When the bag is partially formed the corners 16 of the cloth envelope 5 will extend upwardly and the edges 7, 13, 8, 14 will have a more or less irregular concave shape as shown in Fig. 4 in which the fabric ply is shown in dotted lines and the paper ply in full lines. Since the paper lining 6 is smaller in one direction than the cloth envelope 5 the corners 17 of the paper lining will not project as high as the corners 16 of the outer envelope. The edges 9 and 10 of the paper lining will assume approximately the same position as the corresponding position of the edges 8 and 7 of the outer envelope, but the edges 11 and 12 of the paper lining will be lower than the edges 13 and 14 of the envelope as shown in Fig. 4. When the bag is to be tied after it has been filled, the tie string 15 is applied thereto at a point slightly above the lowest point 18 of the edges 11 and 12 of the lining, and as a result when the string is firmly tied the edges 9 and 10 of the lining will be tied into the tie string, but the central portions of the edges 11 and 12 of the paper lining will be below the tie string.

It will be understood, of course, that after the tie string 15 is firmly tied the projecting corners of the two plies are cut off just above the string to give the bag the appearance shown in Figs. 2 and 3.

Because the tie string is tied about the neck of the bag above the lowest point 18 of the sides 11 and 12 of the paper ply, the bag will present a vent opening 19 through the paper ply below the tie string, this vent opening being at the point where the edge 11 or 12 of the paper ply is not tied into the tie string.

If the paper ply 6 is superposed centrally on the cloth ply then there will probably be two such vent openings, one at each side of the bag where each of the edges 11 and 12 have not been tied into the tie string.

While in Figs. 1 to 4 the bag is shown as formed with the filtering ply 3 on the inside, yet if the bag were formed in the same way as above-described but with the filtering ply on the outside of the bag and the fabric ply on the inside, said bag will still be provided with the vent openings at the point where the edges 11 and 12 were not tied into the tie string.

Where a bag provided with a paper lining having a vent opening as above described is used in making coffee, the vent opening 19 provides a vent through which any gas which is generated by the contact of the hot water with the coffee grounds may escape so that it will not constitute any hindrance to the ready circulation of water through the bag. The coffee liquor, being of greater specific gravity than water, tends to gravitate downwardly through the bag to the bottom of the cup as shown by the arrows $a$ in Fig. 3, and this gravitation will induce a circulation of water through the bag, the water entering the top of the bag as shown by arrows $b$ and gravitating through the coffee grounds as indicated by the arrows. The presence of the vent opening 19 not only provides for the escape of the gas which retards such circulation but also assists circulation by providing a path through which the water may freely enter the bag. If desired, I may make the lining 6 with slits or small apertures indicated at 20 which will be situated at the bottom of the bag after it has been made and which serve to promote the desired circulation of water through the bag.

Although a bag made as above described is formed with a vent opening through the filtering ply, yet the construction of the bag is such that no coffee grounds or tea dust can readily pass through the vent opening. It will be noted that this vent opening is in the portion of the filtering ply which is gathered together at the neck of the bag and thus will be more or less closed by the folds of the paper. Furthermore, the gathering together of the fabric ply at the neck of the bag produces several layers or folds of fabric which overlie the vent opening and thus serve to prevent the passage therethrough of any tea dust or coffee powder.

In the construction shown in Fig. 5 the lining member is indicated at 6a, and it is smaller in all directions than the ply 5 of fabric. When a bag is made from a two-ply blank, such as shown in Fig. 6, the corners 17 only of the paper ply 6a will be tied into the tie string, and there will be provided four vent openings in the upper part of the bag beneath the tie string at points where the four sides 21, 22, 23 and 24 of the lining member are not tied into the tie string.

It is possible to make a bag from a blank in which the filtering ply is substantially circular in shape and of such a size that when the edges of the blank are gathered together and tied with a tie string, all or substantially all of the edge of the circular filtering ply will be below the tie string, thus providing the annular vent immediately below the tie string.

In the above embodiments of the invention the two plies, that is, the strength-giving outer fabric ply and the filtering inner ply, are separate plies superposed on each other. My invention may also be embodied in a bag wherein the two plies were made together as a unit, as illustrated in Figs. 6 and 7, wherein 25 indicates a fabric layer and 26 indicates the filtering layer of paper material which is matted or built onto one side of the fabric layer 25. This could be accomplished either during the papermaking operation by depositing the paper stock directly on the fabric as the paper was made, or the paper layer and the fabric layer could be made separately and subsequently united to make a unitary structure by any well-known operation. In making a bag from this material, however, a blank would be used in which the paper stock did not cover the entire area of the cloth backing, so that when the bag is formed and the tie string is applied there would be a portion of the fabric below the tie string which was not covered by the paper and which formed the required vent opening.

In Figs. 8 to 11 I have shown my invention as it might be embodied in a sewed tea bag or coffee bag, that is, a bag which is made from a blank folded along a median line and having its edges sewed together. Such a bag is shown at 30 and it is made with the two plies 31 and 32, one of which is of fabric and the other of which is of paper. The bag is shown as containing tea or coffee 33. This bag may be made from a blank 34 such as shown in Fig. 9, which has the two plies 31 and 32, one of cloth and one of paper, by folding the blank along the median line 35 to bring the edges of one half into register with the edges of the other half and then sewing the edges together by means of a seam 36, preferably an over-edge seam in which the stitches extend around and enclose the edges of the bag. It will be understood that if the bag is to be used as a coffee bag or tea bag the coffee or tea will be introduced into it before it is entirely closed by the sewing operation.

In making bags of this type it is common to extend the stitching beyond the bag at one corner as shown at 37 to form a connection to which may be attached a tag 38 indicating the character of the contents of the bag.

In making a bag of this type from the two-ply blank said blank may be folded so that the fabric ply 31 will be on the outside and the paper ply on the inside, or said blank may be folded so that the fabric ply will be on the inside and the paper ply on the outside.

During the sewing operation by which the overedge seam 36 is formed the needle will penetrate both the fabric ply and the paper ply. As each stitch is tightened the material between the line of needle thrusts and the edge of the fabric is drawn together into a roll or bead indicated at 40, and the strain on the thread tends to enlarge the needle holes as indicated at 39 in Fig. 10. These enlarged needle holes provide venting apertures through the paper through which any gas that is formed within the bag during the making of a coffee infusion may escape, and said holes also tend to facilitate the circulation of the water through the bag when making a cup of coffee.

While I have illustrated and described two types of bags adapted for use as tea bags or coffee bags, yet the invention is not limited to these particular types but may be embodied in other types.

In Figs. 1 to 7 I have shown a bag wherein the ply of paper material is smaller than the fabric ply. If a bag were made with the paper ply larger than the fabric ply, then it would be necessary to provide the paper ply with suitable apertures or openings to form the desired vent.

While I have referred above to my invention as applied to the manufacture of a tea ball or a coffee bag, yet the invention may be equally applicable to bags used for other purposes than for making tea or coffee where it is advantageous to have the bag made of two plies, one of a fabric ply and the other of which is made of paper material and, therefore, I do not wish to have the invention limited to use in connection with a coffee bag or tea ball.

I claim:

1. A bag containing material for making an individual cup of infusion, said bag being formed of two plies, one of fabric and the other of filtering material, said latter ply being provided with a vent opening in the upper portion of the bag.

2. A bag containing material for making an individual cup of infusion, said bag being formed of two plies, one of fabric and the other of paper filtering material, said latter ply being provided with a vent opening in the upper portion of the bag.

3. A bag containing material for making an individual cup of infusion, said bag having an exterior envelope of fabric and a lining of paper, said lining being provided with a vent opening above the material contained in the bag.

4. A bag containing material for making an individual cup of infusion, said bag having an exterior envelope of fabric and an interior lining of paper, said lining having small perforations at the bottom of the bag and a vent opening at the top of the bag.

5. A bag containing material for making an individual cup of infusion, said bag being formed from a two-ply blank composed of a fabric ply and a paper ply, the edges of which blank are gathered together at the neck of the bag, a tie string encircling said gathered-together edges and tying them tightly together, said paper ply having a vent opening above the material contained in the bag.

6. A bag containing material for making an individual cup of infusion, said bag being formed from a two-ply blank having a fabric ply and a paper ply, the edges of the blank being gathered together to close the bag and the paper ply being on the inside of the bag, a tie string encircling the gathered-together edges, said paper ply having a smaller dimension than the fabric ply, and a portion of at least one edge of the paper ply being located below the tie string whereby a vent opening is formed.

7. A bag formed from a two-ply blank composed of a fabric ply and a ply of paper material, the edges of which blank are gathered together at the neck of the bag, a tie string encircling said gathered-together edges and tying them tightly together, said ply of paper material having a vent opening at the top of the bag.

8. A bag formed from a two-ply blank composed of a fabric ply and a ply of filtering material, the edges of which blank are gathered together at the neck of the bag, and a fastening device tightly encircling said gathered-together edges, said ply of filtering material having a vent opening at the top of the bag but below the fastening device.

9. A bag formed from a two-ply blank composed from a fabric ply and a ply of filtering material, the edges of which blank are gathered together at the neck of the bag, and a fastening device tightly encircling said gathered-together edges, the ply of filtering material being sufficiently smaller than the fabric ply to provide a vent through the filtering material below the fastening device.

10. A bag formed from a two-ply blank composed of a fabric ply and a ply of filtering material superposed one on the other, means securing the edges of the blanks together to form a bag, the ply of filtering material being sufficiently smaller than the fabric ply so that a portion of the wall of the blank adjacent the securing means is formed of a portion of the blank outside the edge of the ply of filtering material whereby said portion of the bag forms a vent opening.

11. A bag formed from a two-ply blank composed of a fabric ply and a ply of filtering material, means securing the edges of the blank together to form a bag, one of said plies being sufficiently smaller than the other ply so that a portion of the wall of the bag adjacent the securing means is formed of a portion of the blank situated outside of the edge of the smaller ply.

12. A bag formed from a two-ply blank composed of a fabric ply and a ply of filtering material, the edges of which blank are gathered together at the neck of the bag, and a fastening device tightly encircling said gather-together edges, the ply of filtering material being smaller than the fabric ply and the fastening device being located at a point above a portion of the edge of the smaller ply of filtering material whereby the bag is provided with a vent opening below said fastening device.

RALPH N. DOBLE.